US012562464B2

(12) United States Patent
Eid et al.

(10) Patent No.: US 12,562,464 B2
(45) Date of Patent: *Feb. 24, 2026

(54) HIGH GAIN AND LARGE BEAMWIDTH ROTMAN-LENS-BASED AND MM-WAVE ENERGY HARVESTER SYSTEMS AND ASSOCIATED METHODS

(71) Applicant: Georgia Tech Research Corporation, Atlanta, GA (US)

(72) Inventors: Aline Eid, Ann Arbor, MI (US); Jimmy Georges Donald Hester, Ann Arbor, MI (US); Emmanouil Manos Tentzeris, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/744,543

(22) Filed: Jun. 14, 2024

(65) Prior Publication Data

US 2024/0339750 A1 Oct. 10, 2024

Related U.S. Application Data

(63) Continuation of application No. 17/607,435, filed as application No. PCT/US2020/030721 on Apr. 30, 2020, now Pat. No. 12,015,195.

(60) Provisional application No. 62/840,798, filed on Apr. 30, 2019.

(51) Int. Cl.
| | |
|---|---|
| *H01Q 1/24* | (2006.01) |
| *H01Q 21/06* | (2006.01) |
| *H01Q 25/00* | (2006.01) |
| *H02J 50/00* | (2016.01) |
| *H02J 50/27* | (2016.01) |

(52) U.S. Cl.
CPC ........... *H01Q 1/248* (2013.01); *H01Q 21/065* (2013.01); *H01Q 25/008* (2013.01); *H02J 50/001* (2020.01); *H02J 50/27* (2016.02)

(58) Field of Classification Search
CPC ...................................................... H01Q 1/248
USPC ......................................................... 307/104
See application file for complete search history.

(56) References Cited

U.S. PATENT DOCUMENTS

| | | |
|---|---|---|
| 4,612,547 A | 9/1986 | Itoh |
| 6,031,501 A | 2/2000 | Rausch et al. |
| 10,243,412 B1 | 3/2019 | Fink et al. |

(Continued)

OTHER PUBLICATIONS

International Search Report and Written Opinion from Application No. PCT/US2020/030721 dated Aug. 4, 2020.

*Primary Examiner* — Joseph Chang
(74) *Attorney, Agent, or Firm* — TROUTMAN PEPPER LOCKE LLP; Ryan A. Schneider; Stephanie J. Remy

(57) ABSTRACT

Device, systems, techniques, and methods for mm-wave energy harvesting utilizing a Rotman-Lens-based rectenna system. An energy harvester system can include one or more antenna, a Rotman Lens having a beam port side and an antenna side in electrical communication with the one or more antenna, and a rectifier network in electrical communication with the beam port side of the Rotman Lens. The energy harvester system can also include a power combining network in electrical communication with the rectifier network and having an output. The rectifier network can include a plurality of rectifiers connected to the beam port side of the Rotman Lens. Further, each of the plurality of rectifiers can include a rectifying diode. The power combining network can include a plurality of bypass diodes.

18 Claims, 17 Drawing Sheets

(56)　　　　　　References Cited

U.S. PATENT DOCUMENTS

| | | |
|---|---|---|
| 2016/0301257 A1 | 10/2016 | Parks et al. |
| 2018/0352519 A1 | 12/2018 | Navarro et al. |

100

1700

MEMORY
1705

OS
1706

ENERGY HARVESTING
PROCESSOR
1710

SYSTEM
PROCESSOR
1715

REMOVABLE
STORAGE
1720

NON-REMOVABLE
STORAGE
1725

OUTPUT
DEVICES
1735

INPUT
DEVICES
1740

TRANSCEIVERS
1730

HIGH GAIN AND LARGE BEAMWIDTH ROTMAN-LENS-BASED AND MM-WAVE ENERGY HARVESTER SYSTEMS AND ASSOCIATED METHODS

CROSS-REFERENCE TO RELATED APPLICATIONS

This is a continuation application of U.S. application Ser. No. 17/607,435 filed 29 Oct. 2021, which is a National Stage Application of International Application No. PCT/US20/30721 filed 30 Apr. 2020, which National Stage Application claims the benefit of U.S. Provisional Application Ser. No. 62/840,798 filed 30 Apr. 2019, the entire contents and substance of which are hereby incorporated by reference as if fully set forth below.

STATEMENT REGARDING FEDERALLY SPONSORED RESEARCH OR DEVELOPMENT

This invention was made with government support under Grant No. 1332348 (CCF-1332348) awarded by the National Science Foundation. The government has certain rights in the invention.

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

Examples of the present disclosure relate to a systems and methods for mm-wave energy harvesting utilizing a Rotman-Lens-based rectenna system, and more particularly to systems and methods for mm-wave energy harvesting having a Rotman Lens and both RF and DC combination networks.

2. Description of Related Art

By the end of 2020, it is projected that roughly 50 billion Internet of Things (IoT) devices will be installed. The massive increase in devices creates an explosive growth of mobile traffic demand. The fifth generation (5G) of wireless networks addresses this problem through incorporation of the millimeter wave (mmWave) band, which runs from ~30 GHz to ~300 GHz, into these 5G networks. 6G is close on the horizon, being a future technical standard of a sixth-generation technology for wireless communications.

Additionally, with the massive increase in devices comes a massive increase in energy required to power such devices. Accordingly, the design and realization of energy-autonomous, self-powered systems (e.g., perpetual power for IoT devices) is therefore highly desirable.

One potential way of satisfying these goals is through electromagnetic energy harvesting. The electromagnetic energy present in the 5G networks, especially in the mmWave band where the limits of allowable transmitted power by the FCC regulations are pushed beyond that of their lower-frequency counterparts, presents great opportunity for energy harvesting systems. To harvest enough electromagnetic energy, large aperture antennas are required. Due to the narrower beamwidths present in the mmWave band, modular antennas arrays are utilized instead of single elements. However, one limitation accompanies large gain antennas arrays is the inability to provide an isotropic angular coverage. As the relative orientations of the sources and harvesters are generally unknown, the use of large aperture mmWave harvesters presents large challenges.

Individual rectennas, constituted of small antenna elements, can be DC combined. However, this approach does not increase the sensitivity (lowest turn-on power) of the overall rectenna system. Such an increase in sensitivity can only be achieved through RF combining. Additionally, beamforming networks (BFNs) are used to effectively create simultaneous beam angular coverage with large-gain arrays, by mapping a set of directions to a set of feeding ports. Common techniques rely on the integration of active devices to achieve amplitude or phase variations for electronically scanning antenna arrays. This approach can be costly and lossy for these antenna arrays, especially when a large number of beams need to be scanned. Further, hybrid combination techniques based on Butler matrix networks have been used for energy harvesting at lower frequencies to achieve wider angular coverage harvesting. Such techniques rely on ultra-high-frequency (UHF) arrays, which are impractically large for IoT applications and the implementation of their Butler matrices at higher frequencies would necessitate costly high-resolution fabrication.

Therefore, there exists the need for a new energy harvesting system capable of high gain and large angular coverage, in order to enable the next generation wireless communication systems.

BRIEF SUMMARY OF THE INVENTION

Some or all of the above deficiencies may be addressed by certain embodiments of the disclosed technology. Disclosed embodiments provide mixed-signal power amplification systems and methods.

An exemplary embodiment provides energy harvesting system having one or more antenna, a Rotman Lens having a beam port side and an antenna side in electrical communication with the one or more antenna, and a rectifier network in electrical communication with the beam port side of the Rotman Lens.

In any of the embodiments disclosed herein, the energy harvesting system may further comprise a power combining network in electrical communication with the rectifier network and having an output.

In any of the embodiments disclosed herein, each of the one or more antenna comprises one or more serially-fed patch antenna.

In any of the embodiments disclosed herein, each of the one or more antenna comprises an omni-directional antenna.

In any of the embodiments disclosed herein, the antenna side of the Rotman Lens comprises one or more antenna ports.

In any of the embodiments disclosed herein, each of the one or more antenna ports of the antenna side of the Rotman Lens are in electrical communication with a respective antenna of the one or more antenna.

In any of the embodiments disclosed herein, there are eight antennae ports of the antenna side of the Rotman Lens and eight antennae.

In any of the embodiments disclosed herein, the energy harvesting system comprises (i) tapers between the antenna side of the Rotman Lens and the one or more antennas and (ii) tapers between the beam port side of the Rotman Lens and the rectifier network.

In any of the embodiments disclosed herein, the beam port side of the Rotman Lens comprises a plurality of beam ports.

In any of the embodiments disclosed herein, the rectifier network comprises a plurality of rectifiers connected to a respective beam port of the plurality of beam ports.

In any of the embodiments disclosed herein, each of the plurality of rectifiers comprises a rectifying diode.

In any of the embodiments disclosed herein, the power combining network comprises a plurality of bypass diodes.

In any of the embodiments disclosed herein, the number of bypass diodes is equivalent to $2 \times N$, wherein N is the number of rectifying diodes.

In any of the embodiments disclosed herein, the number of bypass diodes is equivalent to $2 \times (N-1)$, wherein N is the number of rectifying diodes.

In any of the embodiments disclosed herein, the rectifier network comprises a plurality of DC block capacitors.

In any of the embodiments disclosed herein, the energy harvesting system is configured provide at least 110° angular coverage at 28 GHz.

Another embodiment provides an electronic device comprising a memory, a transceiver comprising one or more antenna array, a load, an energy harvesting system, a power source in electrical communication with the energy harvesting system, a second power source in electrical communication with the energy harvesting system.

In any of the embodiments disclosed herein, the energy harvesting system comprises an energy harvesting processor, a Rotman Lens having a beam port side and an antenna side in electrical communication the one or more antenna array of the transceiver, a rectifier network in electrical communication with the beam port side of the Rotman Lens, and a power combining network in electrical communication with the rectifier network and having an output;

In any of the embodiments disclosed herein, the power source and the secondary power source are connected to the energy harvesting system via a switch.

In any of the embodiments disclosed herein, the memory comprises instructions that, when executed by the energy harvesting processor, are configured to cause the system to determine a first power level associated with the first power source, compare the first power level to a predetermined power threshold, and responsive to determining that the first power level falls below a first power threshold, transmit instructions cause the output of the power combining to be in electrical communication with the first power source.

Another embodiment provides method of manufacturing a flexible energy harvesting device comprising providing a first flexible substrate, printing, on the first flexible substrate a Rotman-based rectenna architecture.

In any of the embodiments disclosed herein, the Rotman-based rectenna architecture comprises one or more antenna, a Rotman Lens having a beam port side and an antenna side in electrical communication with the one or more antenna, and a rectifier network in electrical communication with the beam port side of the Rotman Lens In any of the embodiments disclosed herein, the method further comprises providing a second flexible substrate, printing, on the second flexible substrate, a power summation network, and connecting the Rotman-based rectenna architecture of the first flexible substrate to the power summation network of the second flexible substrate through a plurality of individual interconnects.

These and other aspects of the present invention are described in the Detailed Description below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

5

Figure 11:
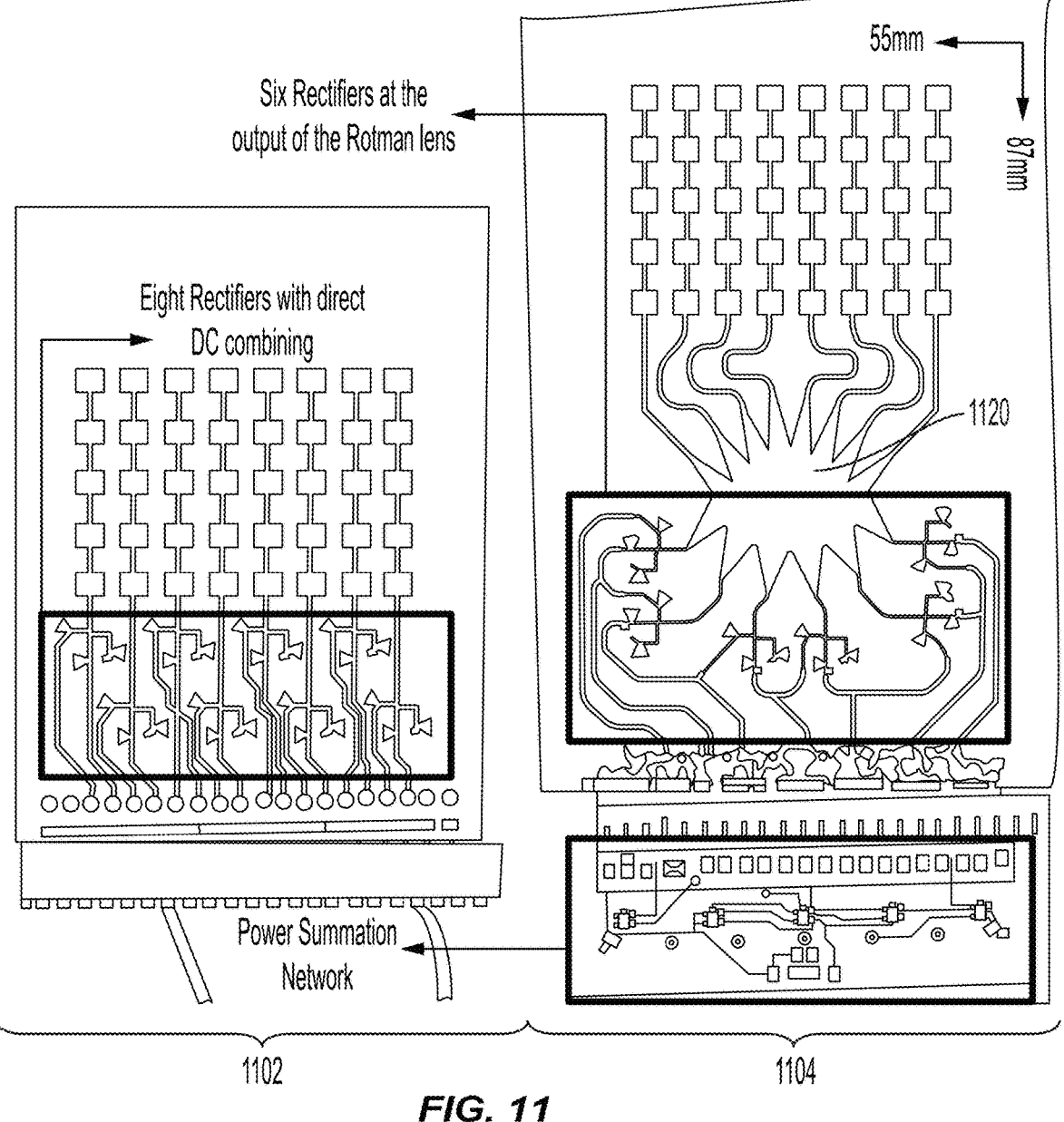

FIG. 11 is an image of a simple rectenna design and a Rotman-based rectenna, in accordance with an example of the present disclosure.

Figure 12:
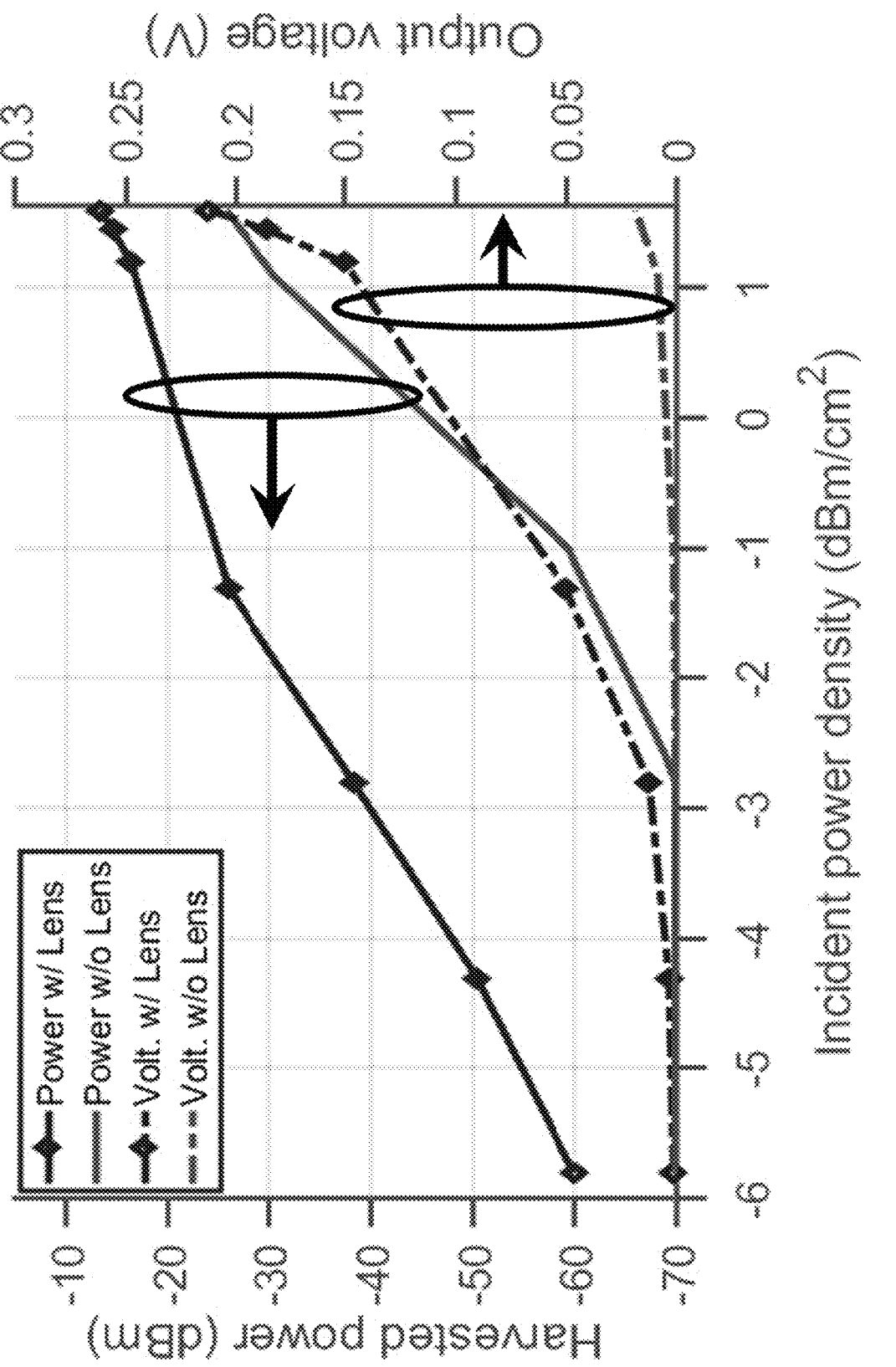

FIG. 12 is a chart depicting the measured voltages and output powers versus incident power density for the example rectennas of FIG. 11 with and without the Rotman Lens, in accordance with an example of the present disclosure.

Figure 13:
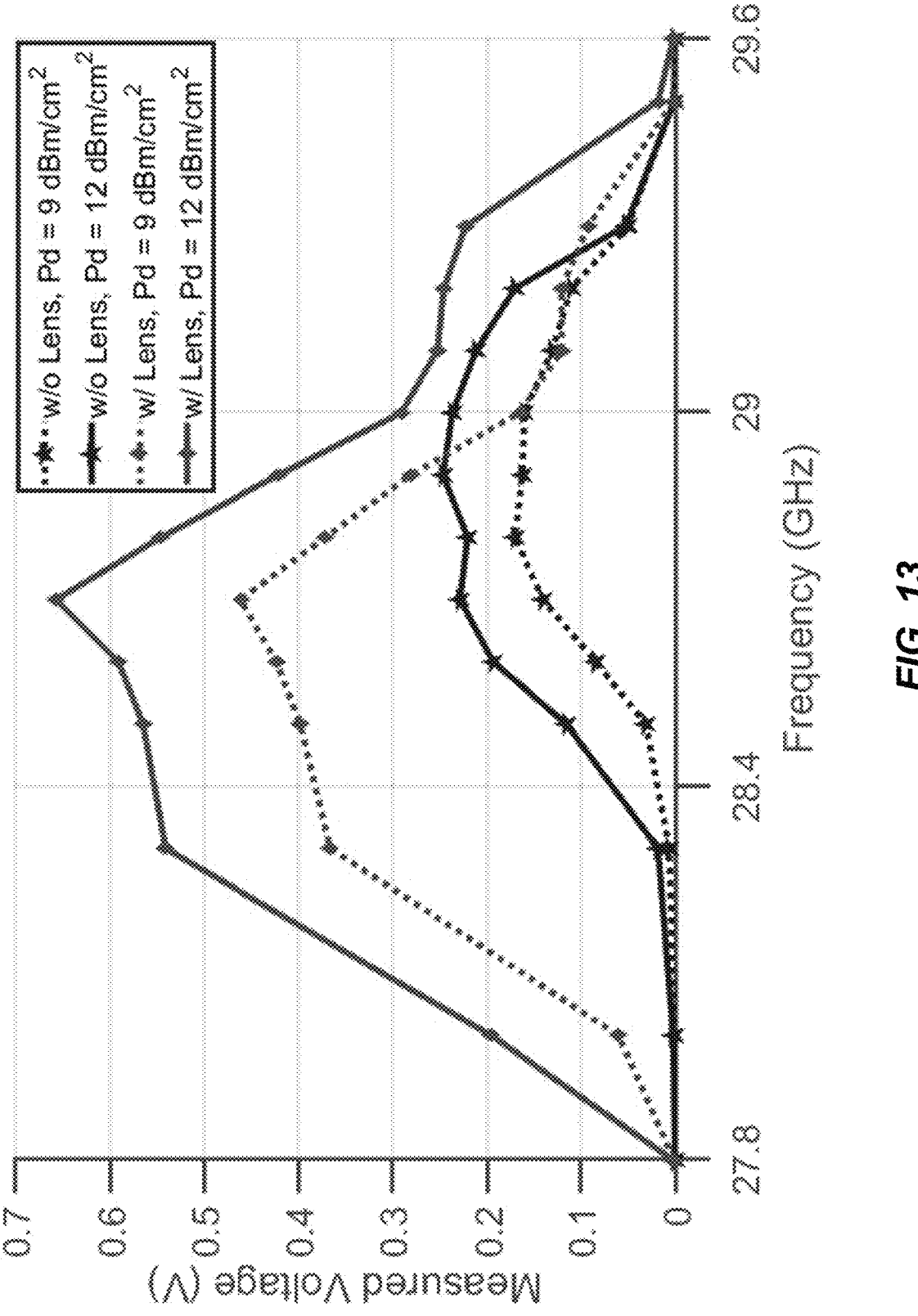

FIG. 13 is a chart depicting the measured voltage versus the frequency for the example rectennas of FIG. 11 with and without the Rotman Lens, in accordance with an example of the present disclosure.

Figure 14:
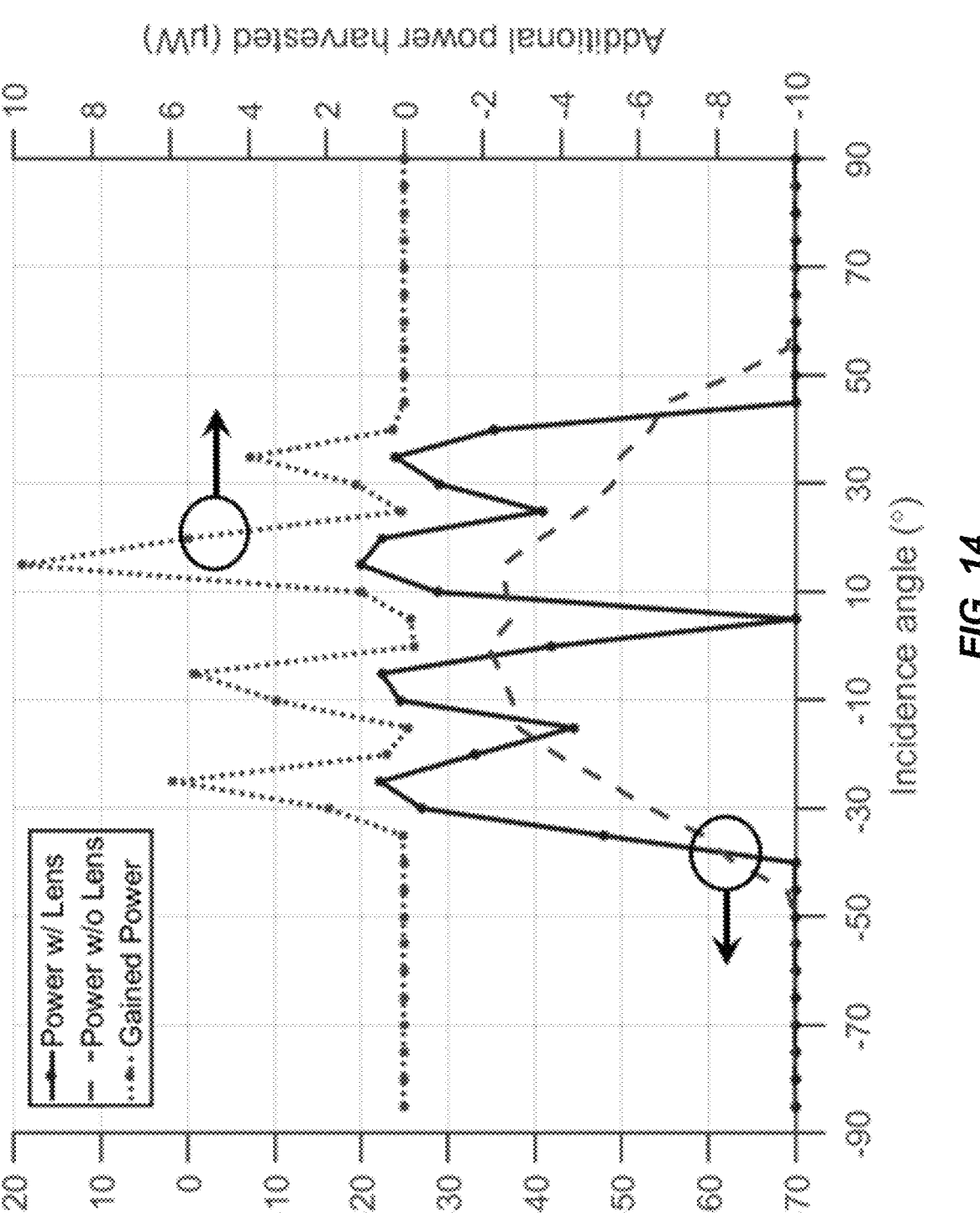

FIG. 14 is a chart depicting the measured harvested power versus angle of incidence for the example rectennas of FIG. 11 with and without the Rotman Lens, in accordance with an example of the present disclosure.

Figure 15:
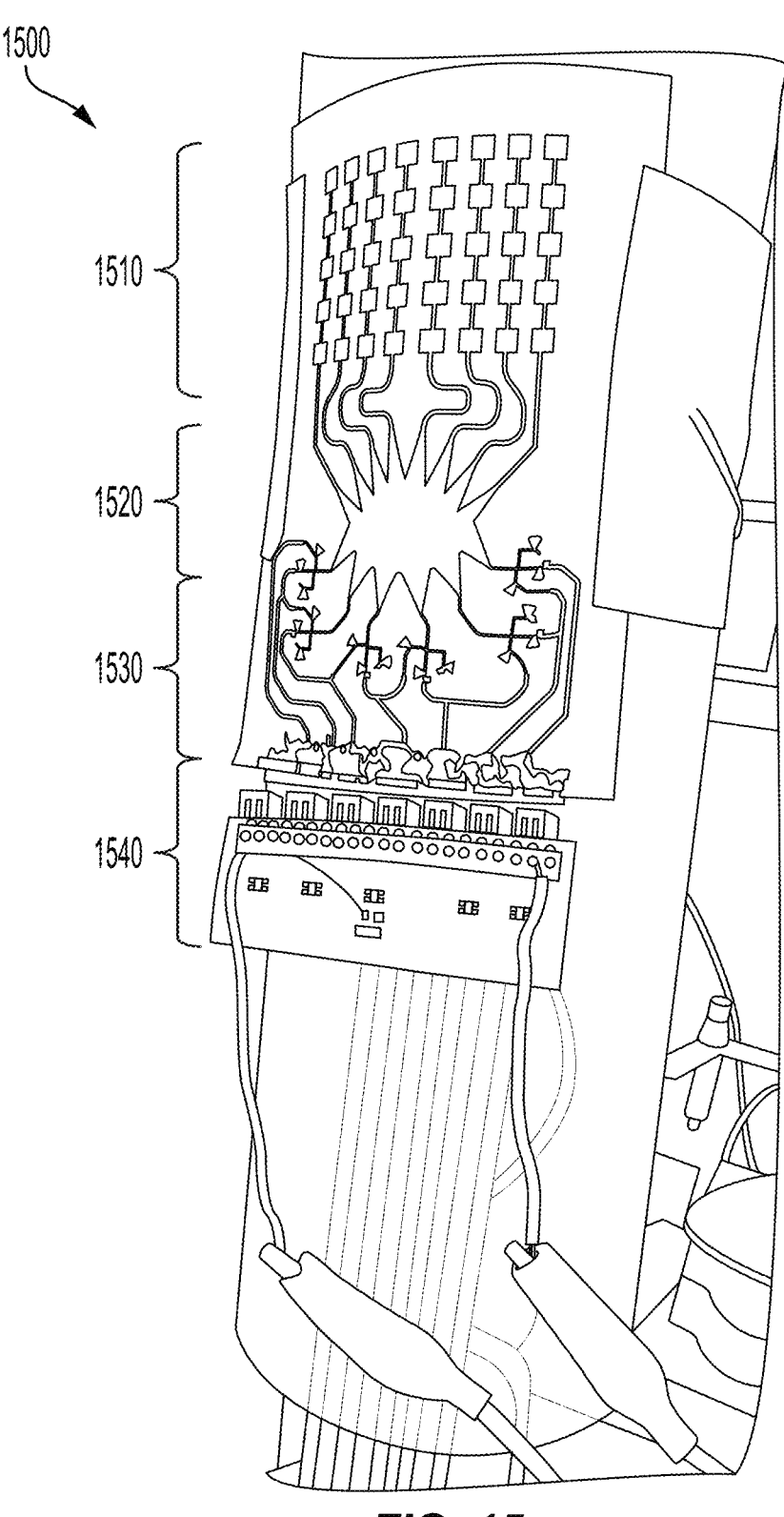

FIG. 15 is an image of a flexible energy harvesting system, in accordance with an example of the present disclosure.

Figure 16:
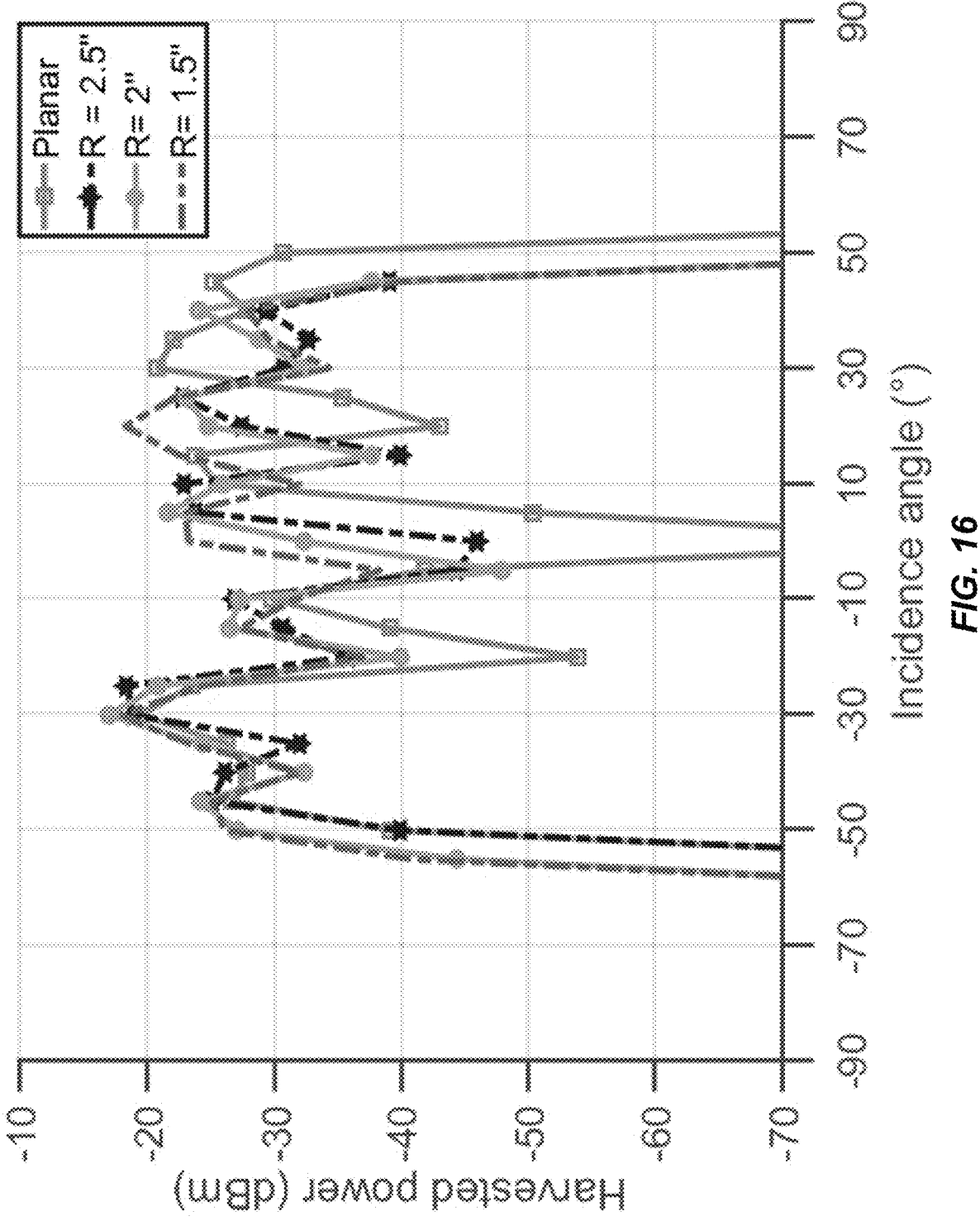

FIG. 16 is a chart depicting the measured harvested power versus angle of incidence for the example flexible energy harvesting system of FIG. 15, in accordance with an example of the present disclosure.

Figure 17:
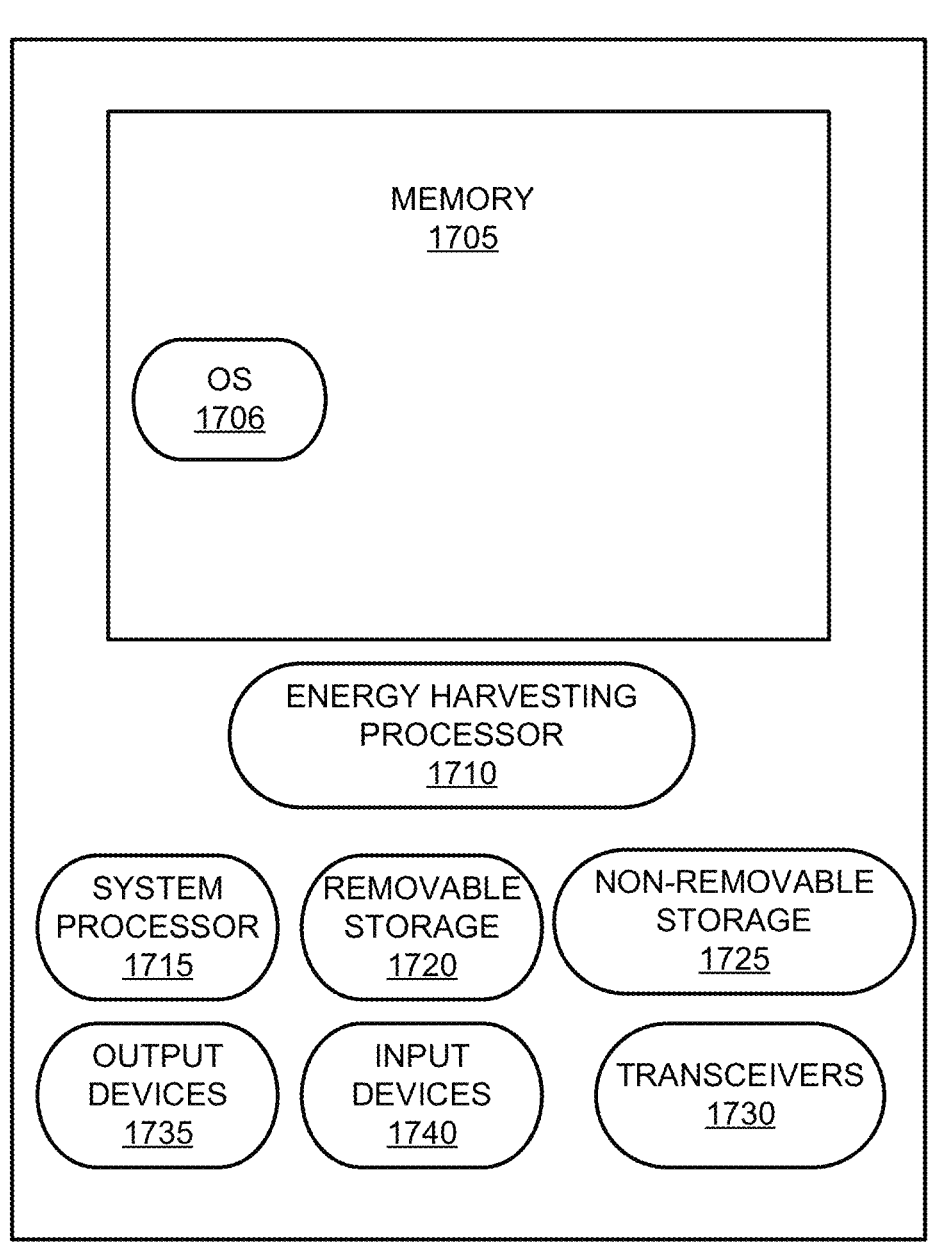

FIG. 17 is an example of an electronic device for use with the systems and methods disclosed herein, in accordance with some examples of the present disclosure.

DETAILED DESCRIPTION OF THE INVENTION

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an," and "the" include plural references unless the context clearly dictates otherwise. References to a composition containing "a" constituent is intended to include other constituents in addition to the one named.

Ranges may be expressed herein as from "about" or "approximately" or "substantially" one particular value and/ or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter. Additionally, the components described herein may apply to any other component within the disclosure. Merely discussing a feature or component in relation to one embodiment does not preclude the feature or component from being used or associated with another embodiment.

As described herein, embodiments of the disclosed technology include systems and methods for mm-wave energy harvesting utilizing a Rotman-Lens-based rectenna system, and more particularly to systems and methods for mm-wave energy harvesting having a Rotman Lens and both RF and DC combination networks. The Rotman lens can be designed to focus energy coming from a given direction into its geometrically associated beam ports. Each beam port can be loaded with a rectifier to channel the energy coming from any direction into one of the rectifiers. Further, the DC outputs of the rectifiers can be serially combined. As will be appreciated, such a design allows the energy harvesting system to provide power to a load regardless of which rectifier is providing the power.

Such characteristics and advantages make energy harvesting systems and devices that incorporate them ideal candidates for inclusion in next generation wireless communication systems to address the rising demand for mobile traffic, such as 5G communication, which will likely incorporate high speed modulation and mmWave band carriers running from 20 GHz to 300 GHz. The 24 GHz, 28 GHz, 33 GHz, 37 GHz, 39 GHz and 42 GHz bands are specific bands that will likely play a role in future 5G communications devices.

The frequency bands for 6G are as of today undetermined. The Institute of Electrical and Electronics Engineers states that "frequencies from 100 GHz to 3 THz are promising bands for the next generation of wireless communication systems because of the wide swaths of unused and unexplored spectrum."

While such bands offer the benefit of increased power transmission, they also pose significant challenges for energy harvesting due to mobility the directional dependence of mm Wave communications. Specifically, the Rotman-Lens-based rectenna system of the proposed energy harvesting system which maps beam direction to a port to allow for beam steering makes the proposed design well suited to overcome the challenges of 5G (and 6G) and mmWave communication. In a certain embodiment of the present invention, an energy harvesting system that can support high gain and large beam width energy harvesting through quasi-isotropic RF combining is presented.

Throughout this disclosure, certain embodiments are described in exemplary fashion in relation to Internet-of-Things technology such as nest thermostats, connected appliances, devices associated with emerging applications such as augmented reality (AR), virtual reality (VR), and mixed reality (MR), and other similar devices. However, embodiments of the disclosed technology are not so limited. In some embodiments, the disclosed technique may be effective in other 5G/6G, mmWave communication, and radar applications. Moreover, embodiments of the disclosed technique may be used in a variety of communication devices, such as smart phones, tablets, 5G/6G systems such as mobile handsets and base-station units.

Some implementations of the disclosed technology will be described more fully with reference to the accompanying drawings. This disclosed technology, however, may be embodied in many different forms and should not be construed as limited to the implementations set forth herein. The components described hereinafter as making up various elements of the disclosed technology are intended to be illustrative and not restrictive. Many suitable components that could perform the same or similar functions as components described herein are intended to be embraced within the scope of the disclosed systems and methods. Such other components not described herein may include, but are not limited to, for example, components developed after development of the disclosed technology.

It is also to be understood that the mention of one or more method steps does not imply a particular order of operation or preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to examples of the disclosed technology, examples of which are illustrated in the accompanying drawings and disclosed herein. Wherever convenient, the same references numbers will be used throughout the drawings to refer to the same or like parts.

Figure 1:
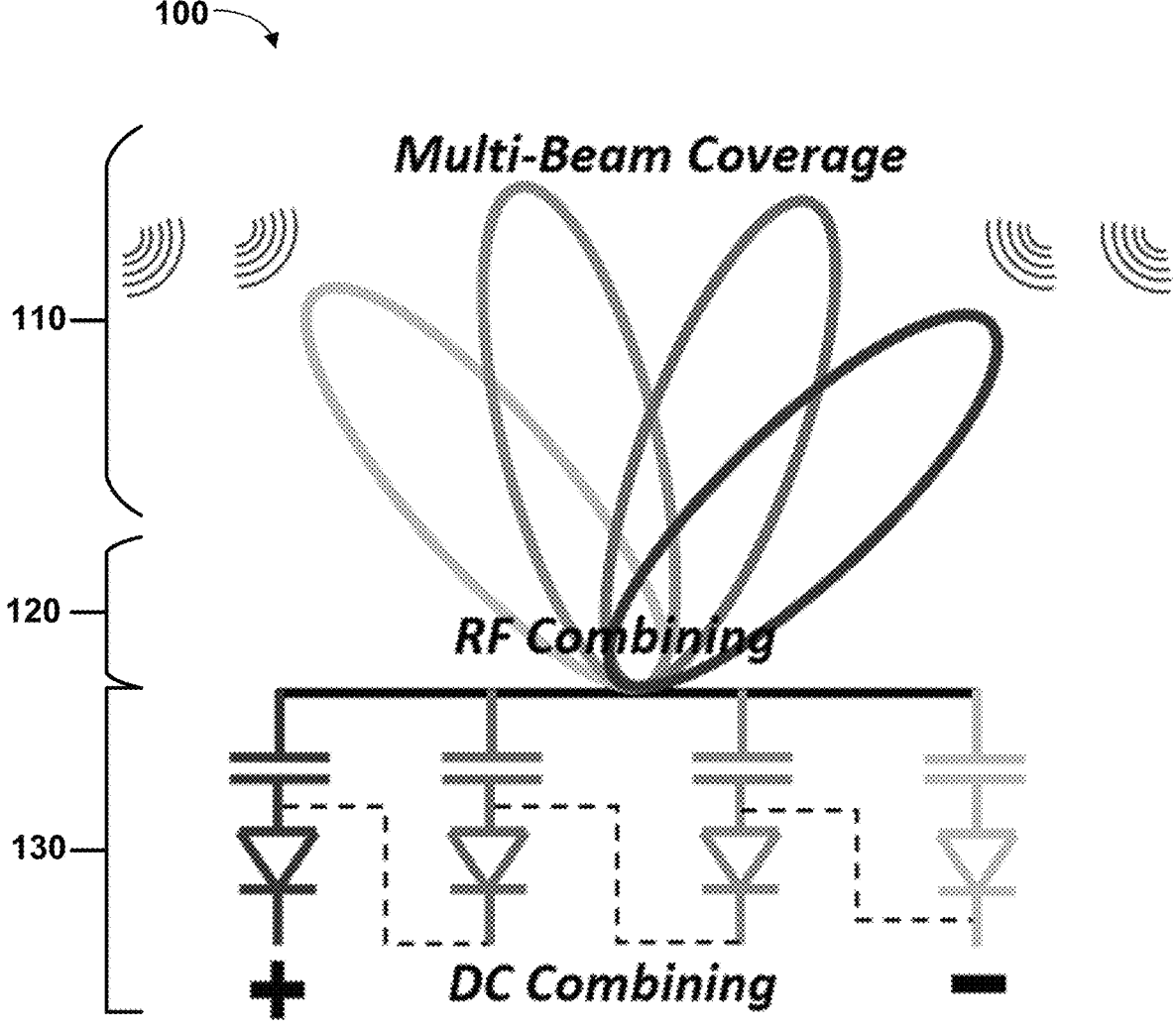
FIG. 1 depicts a block diagram of an energy harvesting system, in accordance with an example of the present disclosure.

FIG. 1 depicts a block diagram of an energy harvesting system 100, in accordance with an example of the present disclosure. Energy harvesting system 100 of FIG. 1 can be used to receive electromagnetic energy from one or more input signal and rectify the signal to convert the electromagnetic energy into DC power to provide to a load. As shown, energy harvesting system 100 can include a receiving stage 110, a rectification stage 120, and a power combining stage 130. As further discussed below, receiving stage 110 can include one or more components configured to receive electromagnetic energy and a Rotman lens. The Rotman lens can focus the energy coming from a given direction into a geometrically-associated beam port of the lens. The ports can be connected to the rectification stage 120, which can include one or more components configured to convert the received energy into DC power. In some examples, the input signal can be received by the receiving stage 110 from the left direction and a rectifier, of the rectification stage 120, located at the right (e.g., diametrically opposite to the received input signal) can receive the combined RF power from all antenna elements at the same phase. As will be appreciated, such an example results constructive combination of signals, however, unlike other RF combining techniques which fail to achieve this constructive addition for input signals impinging from directions too far away from broadside, the Rotman lens can be designed such that at least one of the ports benefits from this effect, regardless of the direction of arrival. Further, the DC outputs of the rectifiers of the rectification stage 120 can be serially combined at the power combining stage 130 to feed their output power to the load. As will be appreciated, the dual combining mechanism (e.g., RF+DC), presented in the diagram of FIG. 1, is enabled by the use of the Rotman lens as an intermediate element between the receiving stage 110 and the rectification stage 120.

Figure 2:
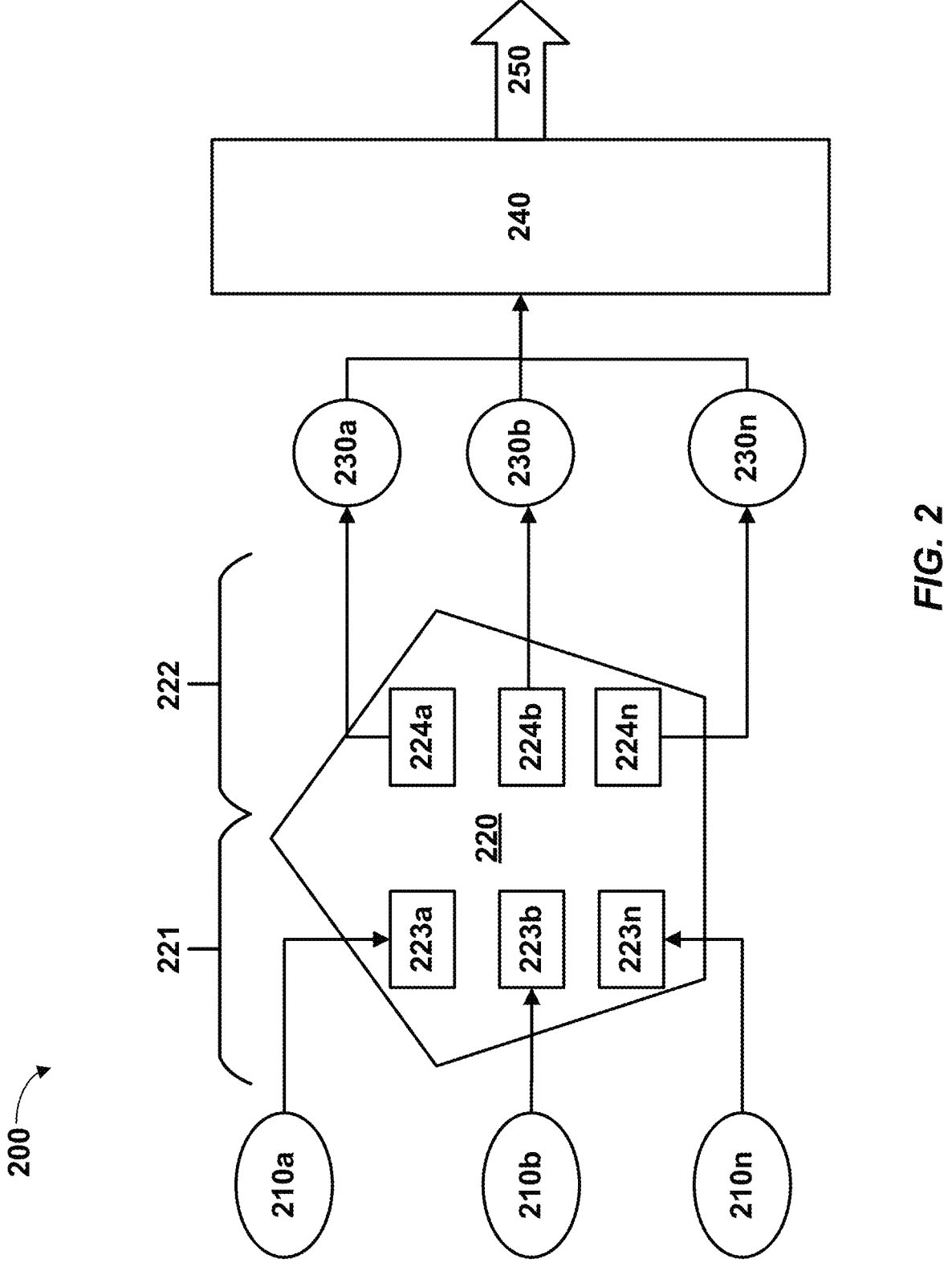
FIG. 2 is a system diagram of an energy harvesting system, in accordance with an example of the present disclosure.

FIG. 2 is a system diagram of an energy harvesting system 200, in accordance with an example of the present disclosure. As shown, energy harvesting system 100 can include one or more antenna 210a-210n, a Rotman lens 220 having an antenna side 221 and a beam port side 222, one or more rectifiers 230a-230n, a power combining network 240, and an output 250. As further depicted, Rotman lens 220 may include one or more antenna port 223a-223n and one or more beam port 224a-224n. The one or more antenna port 223a-223n of the antenna side 221 of the Rotman lens 220 can be in electrical communication with a respective antenna of the one or more antenna 210a-210n. The one or more beam port 224a-224n of the beam port side 222 of the Rotman lens 220 can be in electrical communication with a respective rectifier of the one or more rectifiers 230a-230n. Energy harvesting system 200 of FIG. 2 can be used to receive electromagnetic energy, by one or more antenna 210a-210n, focus the energy, by a Rotman lens 220, onto one or more rectifiers 230a-230n, and then combine the DC output of the one or more rectifiers 230a-230n, by a power combining network 240 into an output line 250 to provide to a load.

The one or more antenna 210a-210n can be a wideband, multiband and/or broadband antenna, having a frequency range, capable of receiving energy signals from the frequency range. The frequency range can be selected for the availability of regulated and unregulated frequencies and/or selected for energy patterns in ambient noise. The one or more antenna 210a-210n can include an antenna array. For example, and as further discussed with respect to FIG. 3, the one or more antenna 210a-210n can include a plurality of serially-fed patch antennas. Further, the one or more antenna 210a-210n can include a fractal antenna. Fractal antennas are compact multiband and/or wideband antennas capable of receiving energy signals within a frequency range of the fractal antenna. Fractal antennas may also be configured to receive energy signals at specific frequencies with the frequency range of the fractal antenna.

As previously mentioned, Rotman lens 220 can include an antenna side 221 having one or more antenna port 223a-223n. The one or more antenna port 223a-223n of the antenna side 221 of the Rotman lens 220 can be in electrical communication with a respective antenna of the one or more antenna 210a-210n. As the antenna side 221 of the Rotman lens 220 receives an input signal from the one or more antenna 210a-210n, the Rotman lens 220 can focus the energy coming from input signal to the beam port side 222 of the Rotman lens 220. For example, the Rotman lens 220 can focus energy coming from input signal to the one or more beam port 224a-224n of the beam port side 222 of the Rotman lens 220.

As will be appreciated, the Rotman lens 220 operates just like an optical lens, by introducing differential propagation time delays to wavefronts impinging onto the various points of its surface. A significant advantage of this structure is its introduction of true-time delays (TTDs), which translate to ultra-wideband operation. By properly tuning the shape of the lens according to the geometrical optics approximation with the goal of focalizing plane waves impinging on the antenna side 221 of the Rotman lens 220 to different focal points on the beam-ports side 222 of the Rotman lens 220, one achieves a lens-shaped structure with two angles of curvatures, one on the beam-ports side 222 and the other on the antenna side 221. As will be further appreciated, the tuning process maps a set of selected radiation directions to an associated set of beam-ports. Tuning these parameters, by varying the number of antennas ports 223a-223n and beam ports 224a-224n influences the array factor, the angular coverage, and the overall performance. In an example, the Rotman lens 200 includes six beam ports 224a-224n and eight antenna ports 223a-223n. In another example, the Rotman lens 200 includes twelve beam ports 224a-224n and sixteen antenna ports 223a-223n. Further, tapers can be included on both sides of the Rotman lens 220 to create smooth impedance transitions from the input impedance of the one or more antenna 210a-210n to that experienced by the wave in the Rotman lens 220 and, subsequently, from the Rotman lens 220 to the impedance of the beam ports 224a-224n.

The one or more rectifier 230a-230n can convert the energy harvested by the one or more antenna 210a-210n and passed through the Rotman lens 220 to a rectified DC signal. The one or more rectifier 230a-230n, as discussed further herein with reference to FIG. 6, can include a diode, such as, for example, a Schottky Diode, a capacitor, and an output path. For example, the one or more rectifier 230a-230n can include a diode coupled to a capacitor for short term storage and may include an output path to provide power to a load.

As further depicted in FIG. 2, the one or more rectifier 230a-230n can feed into a power combining network 240, which may be configured to combine the DC signals into an output path 250. For example, the DC outputs of the one or more rectifier 230a-230n can be serially combined by the power combining network 240 to feed their output 250 power to the load. The power combining network 240, as discussed further herein with reference to FIGS. 8 and 9, can include a DC combining network having a plurality of diodes. For example, power combining network 240 can include a total of 2×N diodes, where N is the number of rectifying diodes of the one or more rectifier 230a-230n. In another example, power combining network 240 can include a total of 2×(N−1) diodes, where N is the number of rectifying diodes of the one or more rectifier 230a-230n.

Figure 3:
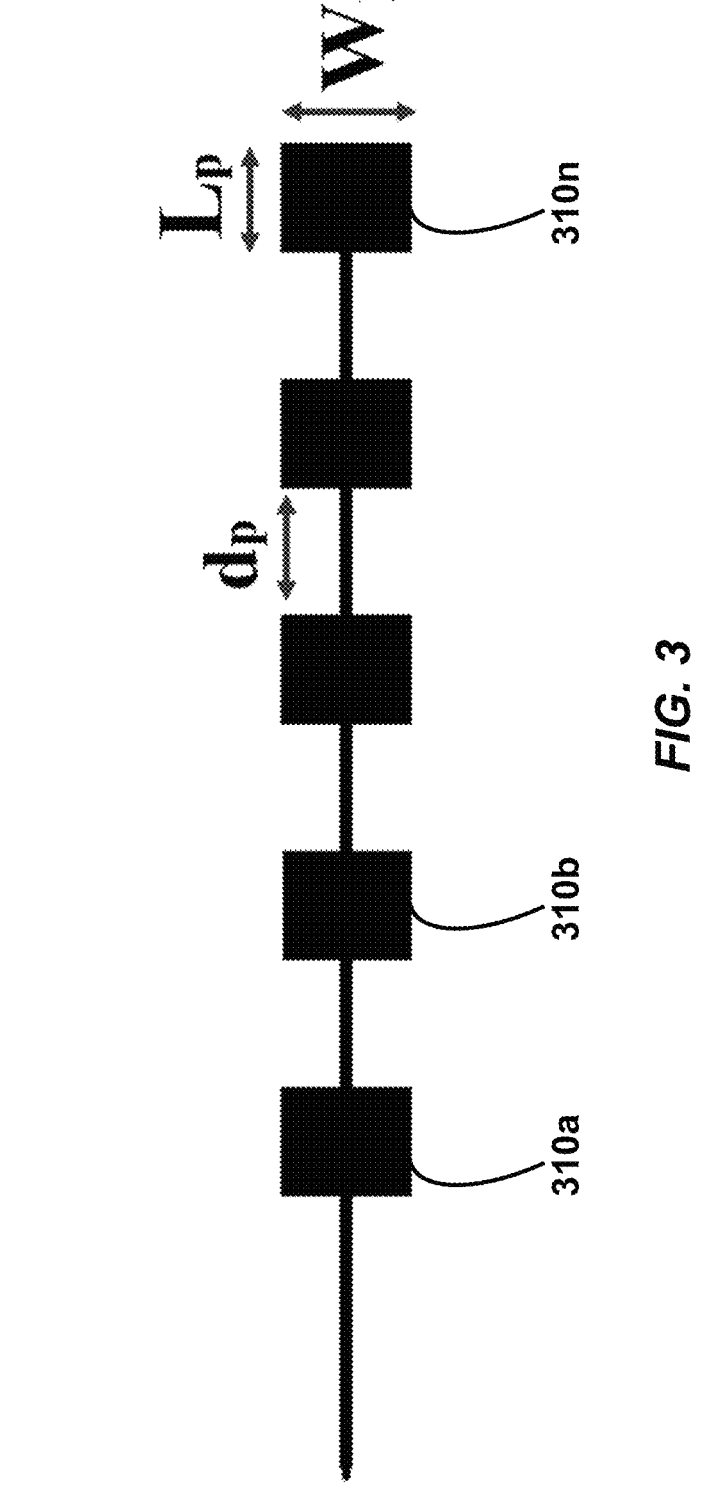
FIG. 3 is a schematic of antenna array, in accordance with an example of the present disclosure.

FIG. 3 is a schematic of antenna array 300, in accordance with an example of the present disclosure. As will be appreciated, antenna array 300 may be desirable for integration into energy harvestings systems as they are scalable and allow for fine control over the aperture of the antenna. As depicted, antenna array 300 can include a plurality of serially-fed patch antennas 310a-310n having a length ($L_p$), width ($W_p$), and distance between antennas ($d_p$). For example, antenna array 300 can include five serially-fed patch antennas 310a-310n having the following dimensions: $L_p$=2.9 mm, $W_p$=3.35 mm, and $d_p$=3.32 mm and providing an operation centered at 28.55 GHz and having a reflection coefficient lower than 20 dB. As will be appreciated, such dimensions and number of antennas can be varied in order to vary the operational point of the antenna array 300. Additionally, antenna array 300 can be manufactured on various substrates. For example, antenna array 300 can be printed on copper-clad liquid crystal polymer (LCP) using an inkjet-printed masking technique followed by etching.

Figure 4:
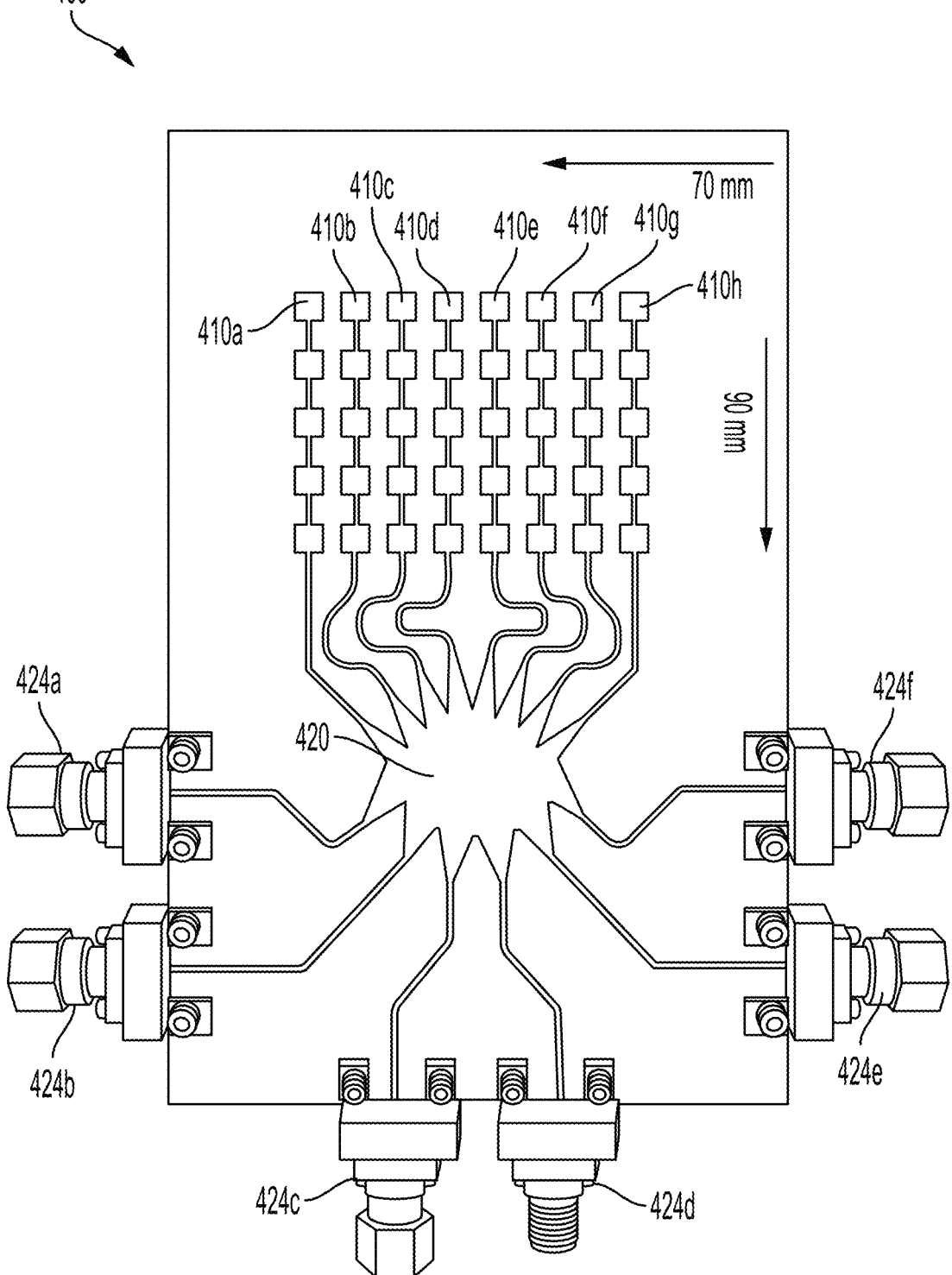
FIG. 4 is an image of a flexible Rotman-Lens-Based antenna array, in accordance with an example of the present disclosure.
Figure 5:
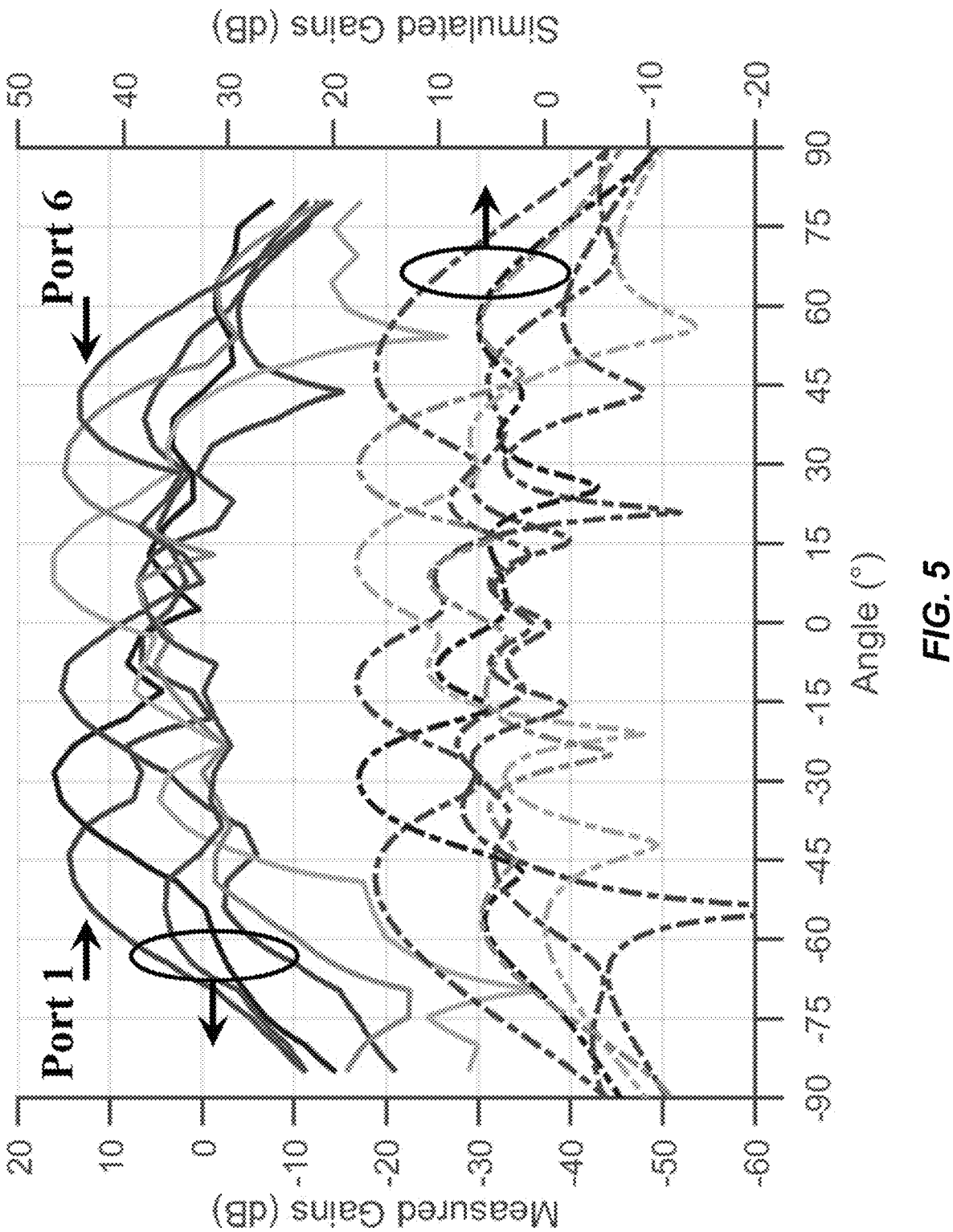
FIG. 5 is a chart depicting measured and simulated radiation patterns and gains of the example flexible Rotman-Lens-Based antenna array of FIG. 4, in accordance with an example of the present disclosure.

FIG. 4 is an image of a flexible Rotman-Lens-Based antenna array 400, in accordance with an example of the present disclosure. As depicted, flexible Rotman-Lens-Based antenna array 400 can include eight antenna arrays 410a-410h connected to a Rotman lens 420 and six beam ports 424a-424. Each antenna array 410a-410h can include five serially-fed patch antennas, providing an operation centered at 28.55 GHz with a reflection coefficient lower than −20 dB within this range. Each beam port 424a-424 can be connected to a connector configured to integrate within an energy harvesting system. FIG. 5 is a chart depicting measured and simulated radiation patterns and gains of the example flexible Rotman-Lens-Based antenna array 400 of FIG. 4, in accordance with an example of the present disclosure. The radiation properties of the flexible Rotman-Lens-Based antenna array 400 were simulated using a time-domain solver. As depicted, both the simulated and measured radiation patters display similarity with a measured gain of approximately 17 dBi, and an angular coverage of around 110°, thereby validating the operation of the flexible Rotman-Lens-Based antenna array 400.

Figure 6:
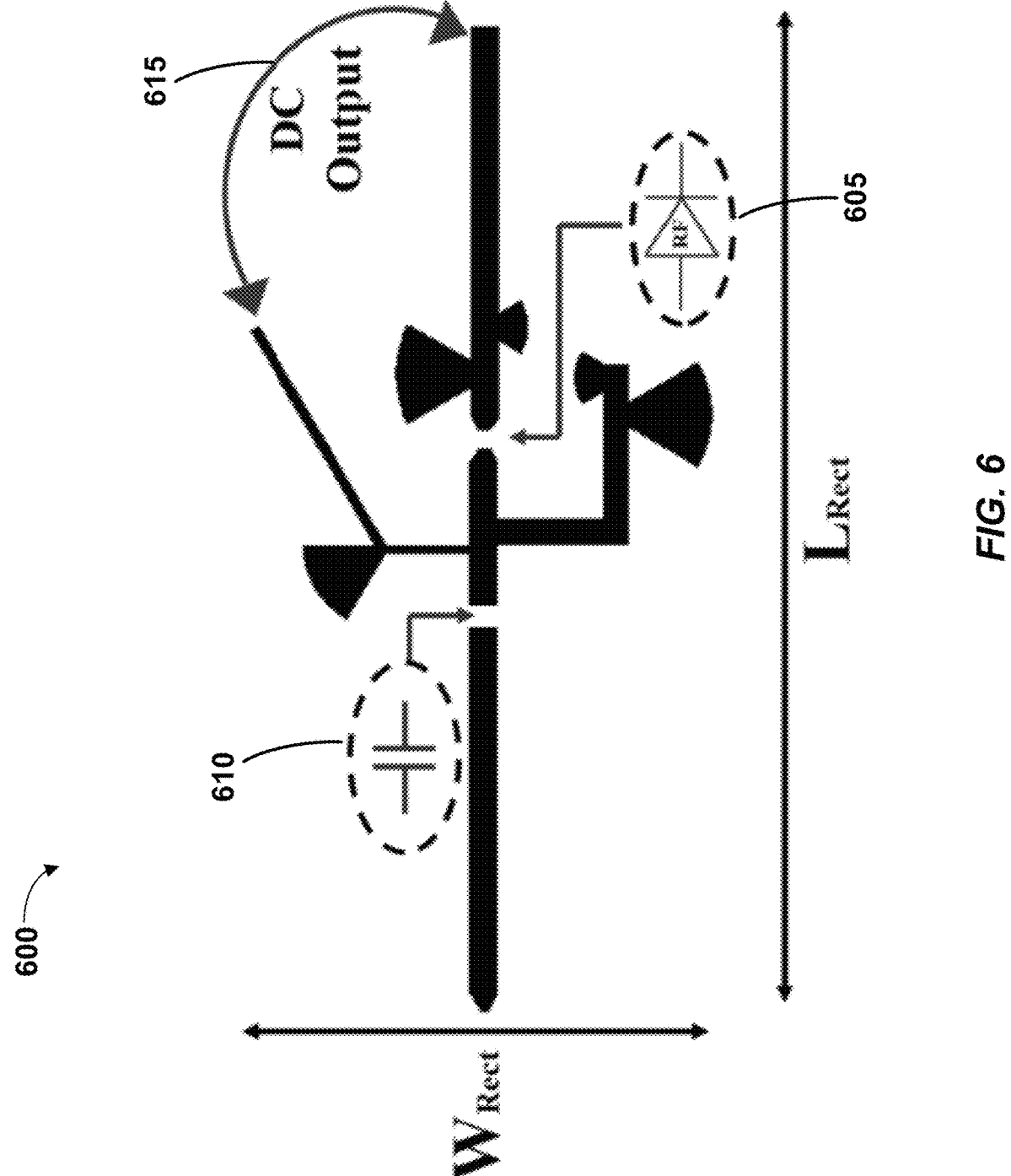
FIG. 6 is a schematic of a rectifier, in accordance with an example of the present disclosure.
Figure 7:
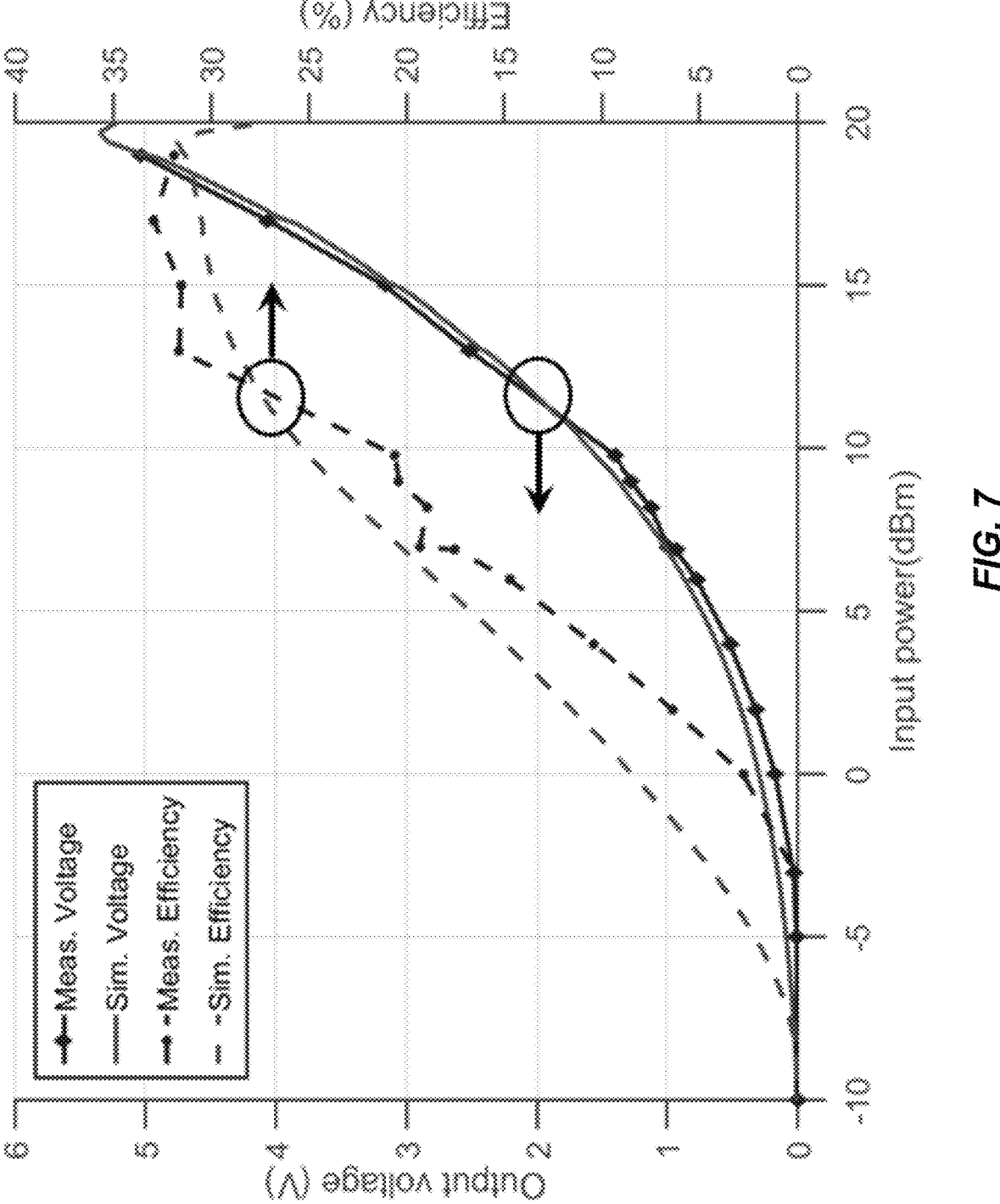
FIG. 7 is a chart depicting the simulated and measured voltages and power conversion efficiencies of the example rectifier of FIG. 6, in accordance with an example of the present disclosure.

FIG. 6 is a schematic of a rectifier 600, in accordance with an example of the present disclosure. As depicted, rectifier 600 can include a diode 605, a capacitor 610, and a DC output 615. Diode 605 can include a diode with low series resistance and high cut-off frequency. For example, diode 605 can be a Schottky diode, such as, for example, a packaged gallium arsenide beam-lead Schottky barrier diode. Capacitor 610 can include an ultra-broadband capacitor and can serve as a DC block for rectifier 600. Capacitor 610 can be connected to a quarter-wave radial stub. As will be appreciated, the stub will provide a virtual short-circuit used to isolate a DC port of the rectifying diode 605. Rectifier 600 can further include an L-network to provide matching at the input to the diode 605. Additionally, rectifier 600 can include two quarter-wave radial stubs configured to counteract the fundamental and second harmonic byproducts of the rectifier 600. Additionally, rectifier 600 can be manufactured on various substrates. For example, rectifier 600 can be printed on copper-clad Rogers crystal polymer (LCP) using an inkjet-printed masking technique followed by etching. FIG. 7 is a chart depicting the simulated and measured voltages and power conversion efficiencies of the example rectifier 600 of FIG. 6, in accordance with an example of the present disclosure. As depicted, both simulated and measured voltages and power-conversion efficiencies (PCEs), for an input power ranging between 10 dBm and 20 dBm with the optimal 1 kΩ load of the structure, demonstrated better than −7 dB matching at 28.5 GHz over the entire power sweep. Further, rectifier 600 demonstrates a very high sensitivity with turn-on power of as low as 10 dBm. Additionally, rectifier 600 demonstrates a constant increase in the output voltage and efficiency until 20 dBm.

Figure 8:
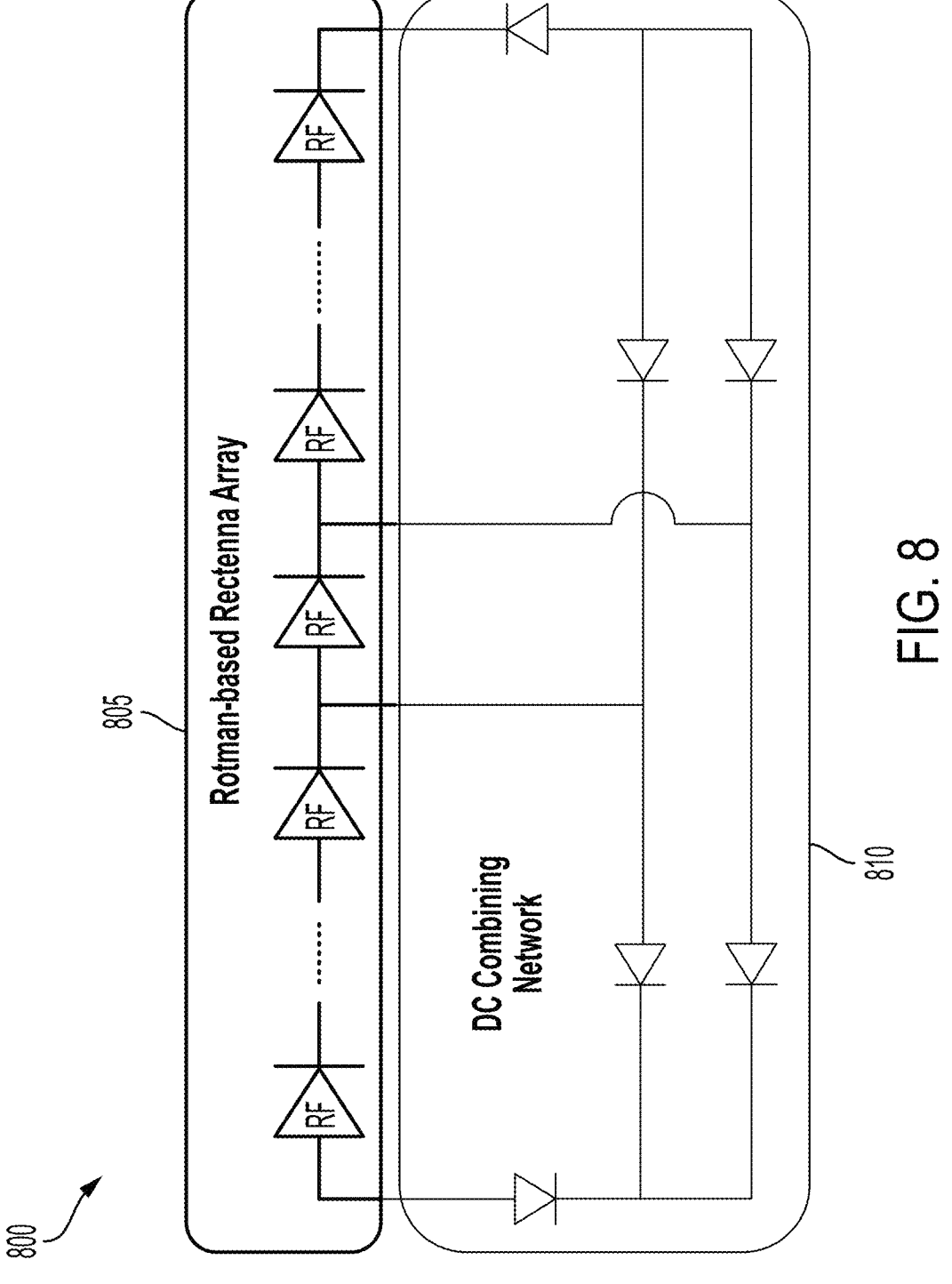
FIG. 8 depicts a block diagram of a power combining network, in accordance with an example of the present disclosure.

FIG. 8 depicts a block diagram of a power combining network 800, in accordance with an example of the present disclosure. As shown, power combining network 800 comprises Rotman-based rectenna array 805 and DC combining network 810. DC combining network 810 introduces a minimalist architecture relying on a total of 2×N bypass diodes, where N is the number of RF or rectifying diodes. The bypass diodes can include a low turn-on voltage, such as roughly 0.1 V. As will be appreciated, such a design creates a low resistance current path around all other rectifiers that received very low or close to zero RF power making this topology optimal when only one diode is turned on, which can be assumed if a single, dominant source of power irradiates from a given direction.

Figure 9:
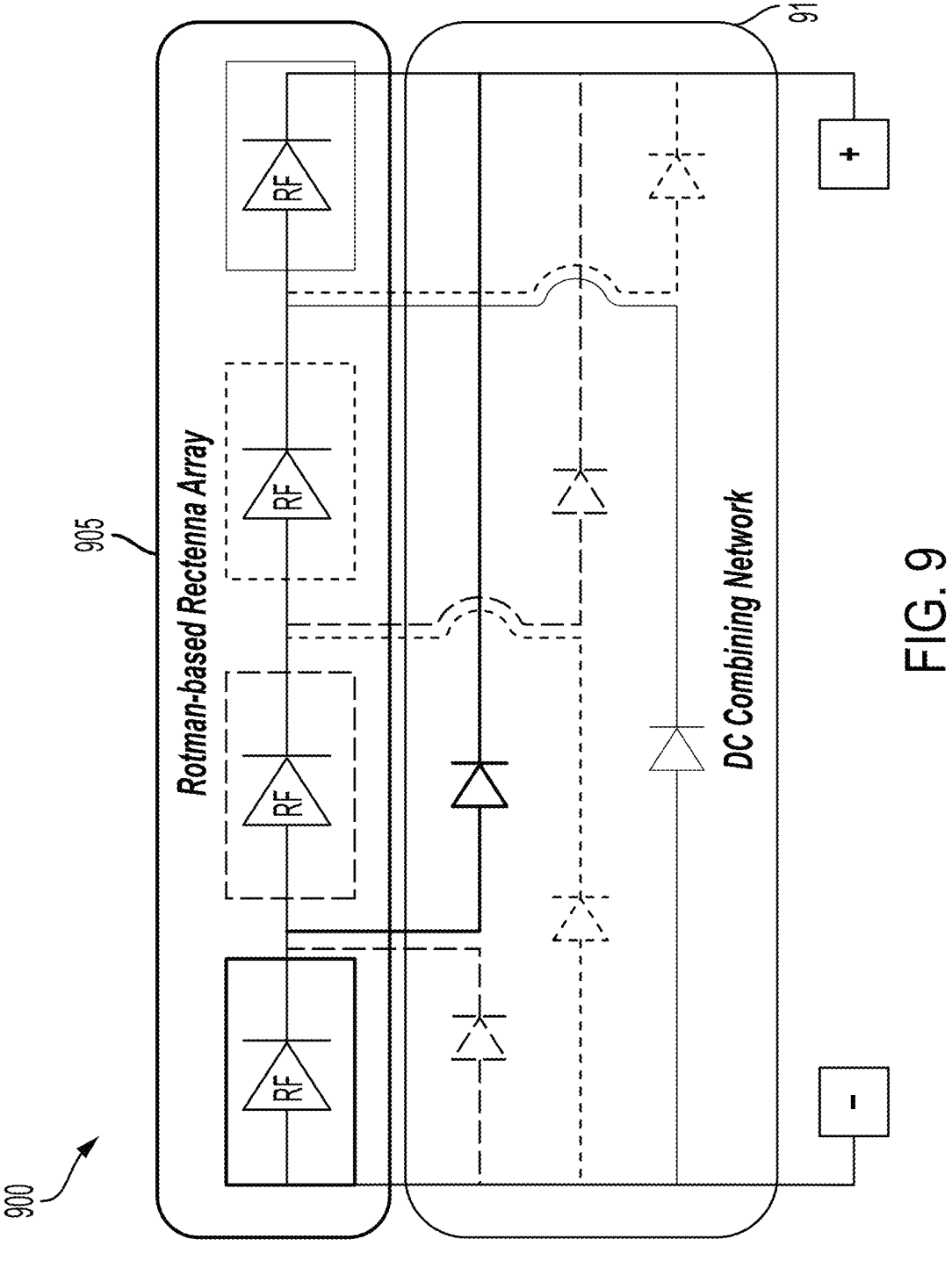
FIG. 9 depicts a block diagram of a power combining network, in accordance with an example of the present disclosure.

FIG. 9 depicts a block diagram of a power combining network 900, in accordance with an example of the present disclosure. As shown, power combining network 900 comprises Rotman-based rectenna array 905 and DC combining network 910. DC combining network 910 introduces a minimalist architecture relying on a total of 2×(N−1) bypass diodes, where N is the number of RF or rectifying diodes. The bypass diodes can include a low turn-on voltage, such as roughly 0.1 V. As will be appreciated, such a design creates a low resistance current path around all other rectifiers that received very low or close to zero RF power making this topology optimal when only one diode is turned on, which can be assumed if a single, dominant source of power irradiates from a given direction. As depicted, Rotman-based rectenna array 905 can include four rectifying diodes and DC combining network 910 can include six bypass diodes. Additionally, DC combining network 910 can be manufactured on various substrates. For example, DC combining network 910 can be fabricated on a flexible 125 μm thin polyimide Kapton substrate. Further, DC combining network 910 can be connected to the Rotman-based rectenna array 905 through a series of single connectors. As will be appreciated, such a design will make power combining network 900 fully flexible and bendable.

Figure 10:
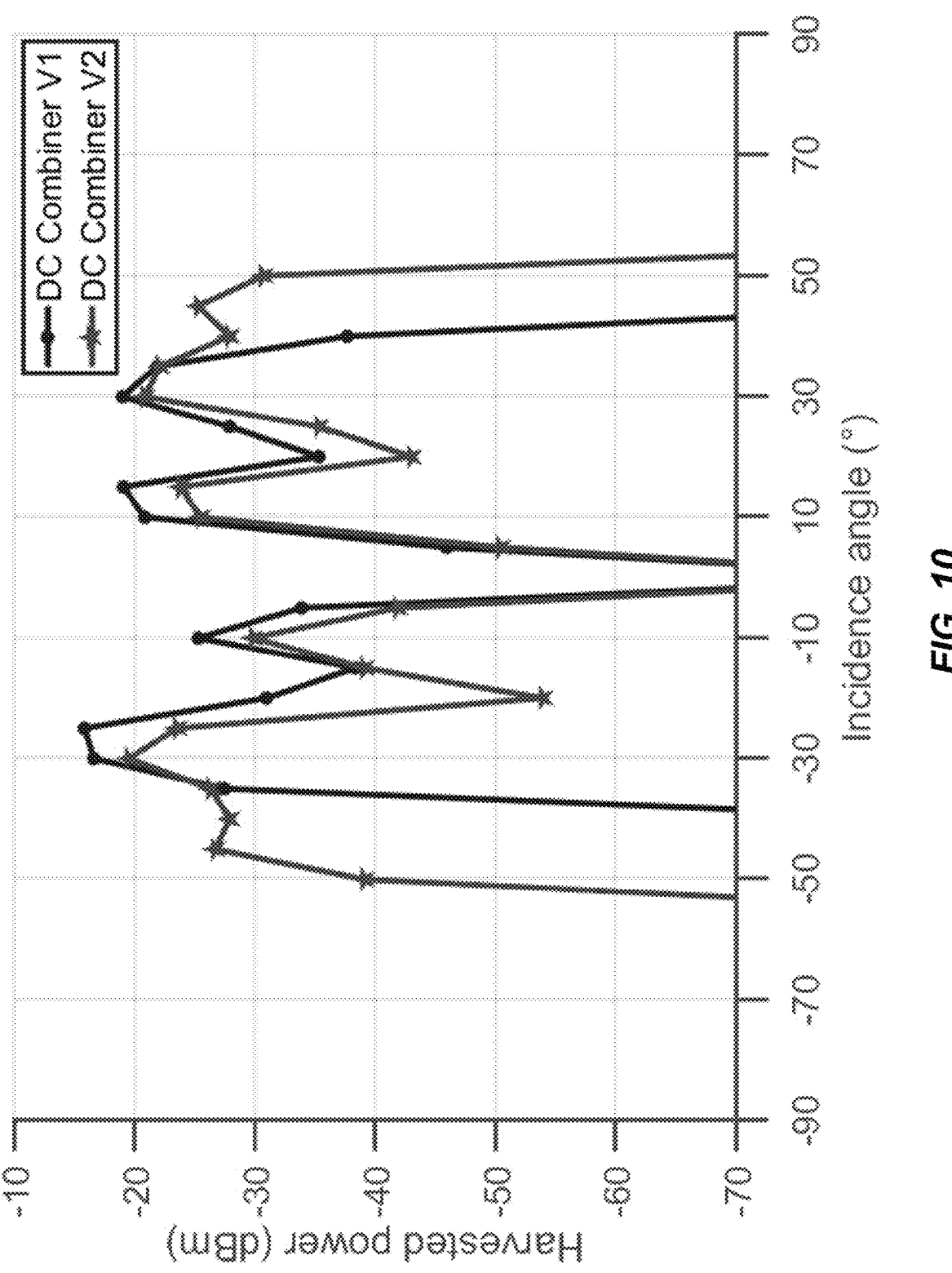
FIG. 10 is a chart depicting the measured harvested powers with respect to the source incidence angle for the example DC combining networks of FIG. 8 and FIG. 9, in accordance with an example of the present disclosure.

FIG. 10 is a chart depicting the measured harvested powers with respect to the source incidence angle for the example DC combining networks 800, 900 of FIG. 8 and FIG. 9, in accordance with an example of the present disclosure. As depicted, DC combining network 900 provides a complete angular coverage of almost 110° over the entire lens spectrum. Therefore, DC combining network 900 offers an increase of more than 30% in the spatial angular in addition to enabling a fully-bendable structure due to the unique fabrication on flexible Kapton substrate and connection to the rectenna using individual interconnects.

FIG. 11 is an image a simple rectenna design 1102 and a Rotman-based rectenna 1104, in accordance with an example of the present disclosure. As shown, simple rectenna design 1102 can include eight antenna arrays and eight diodes as part of a direct serial combining network. Each antenna array of can include five serially-fed patch antennas, providing an operation centered at 28.55 GHz with a reflection coefficient lower than −20 dB within this range. As depicted, Rotman-based rectenna 1104 can include eight antenna arrays connected to a Rotman lens 1120 and six beam ports. Each antenna array of can include five serially-fed patch antennas, providing an operation centered at 28.55 GHz with a reflection coefficient lower than −20 dB within this range. Each beam port can be connected to a connector configured to integrate within an energy harvesting system.

FIG. 12 is a chart depicting the measured voltages and output powers versus incident power density for the example rectenna designs 1102, 1104 of FIG. 11 with and without the Rotman Lens, in accordance with an example of the present disclosure. As shown, at low power, the differences between the designs 1102, 1104 is very pronounced. At incident power densities of less than 2 dBm cm$^{-2}$, simple rectenna design 1102 does not output any power, while the Rotman-based rectenna 1104 turns on well below 6 dBm cm$^{-2}$. FIG. 13 is a chart depicting the measured voltage versus the frequency for the example rectenna designs 1102, 1104 of FIG. 11 with and without the Rotman Lens, in accordance with an example of the present disclosure. FIG. 14 is a chart depicting the measured harvested power versus angle of incidence for the example rectenna designs 1102, 1104 of FIG. 11 with and without the Rotman Lens, in accordance with an example of the present disclosure. As shown, the high harvested power maintained over 90° angular coverage and the average of the Rotman-based array's 1104 harvested power shows a 21-fold gain relative to that of its non-Rotman counterpart 1102.

FIG. 15 is an image of a flexible energy harvesting system 1500, in accordance with an example of the present disclosure. As shown, flexible energy harvesting system 1500 can include receiving stage 1510, a Rotman lens 1520 having an antenna side and a beam port side, a rectifying stage 1530 and a power combining stage 1540. As will be appreciated, the various components of the flexible energy harvesting system 1500 can be manufactured such that the system can maintain stability upon bending. For example, receiving stage 1510, Rotman lens 1520, and rectifying stage 1530 can be printed on copper-clad liquid crystal polymer (LCP) using an inkjet-printed masking technique followed by etching. Additionally, a power combining stage 1540 can be fabricated on a flexible 125 μm thin polyimide Kapton substrate. Further, a power combining stage 1540 can be connected to the rectifying stage 1530 through a series of single connectors. As will be appreciated, such an architecture can lead to the fabrication of flexible mm-wave harvesters that can cover wide areas of space while being electrically large and benefit from the associated improvements in link budget (from source to harvester) and, more importantly, turn-on sensitivity.

FIG. 16 is a chart depicting the measured harvested power versus angle of incidence for the example flexible energy harvesting systems of FIG. 15 having different curvatures, in accordance with an example of the present disclosure. The chart shows operational characteristics of the flexible energy harvesting system 1500 under different bending scenarios. To test the system 1500, three different curvatures with 2.5", 2", and 1.5" bending radii were used. As shown, the results demonstrate that the lens 1520 is able to maintain an efficient electromagnetic energy distribution across the output ports under convex and concave flexing conditions. As will be appreciated, such characteristics qualify this system as a good candidate for use in wearables, smart phones and ubiquitous, conformal 5G energy harvesters for IoT nodes.

FIG. 17 is an example of an electronic device 1700 for use with the systems and methods disclosed herein, in accordance with some examples of the present disclosure. As discussed below, electronic device 1700 may comprise memory 1705 including many common features such as, for example, operating system (OS) 1706. The electronic device 1700 may also comprise one or more energy harvesting processor 1710 and one or more system processors 1715. In some implementations, the system processor(s) 1715 can include a central processing unit (CPU), a graphics processing unit (GPU), or both CPU and GPU, or any other sort of processing unit. The electronic device 1700 may also include one or more of removable storage 1720, non-removable storage 1725, one or more transceiver(s) 1730, output device(s) 1735, and input device(s) 1740.

Energy harvesting processor 1710 may be configured to perform one or more operations associated with energy harvester systems, such as for example those described herein. For example, energy harvesting processor 1710 may determine a first power level associated with a first power source of electronic device 1700. Further, energy harvesting processor 1710 may compare the first power level to a predetermined power threshold. Additionally, responsive to determining that the first power level falls below a first power threshold, energy harvesting processor 1710 may transmit instructions cause the output of a power combining network, such as those described herein, to be in electrical communication with the first power source. Energy harvesting processor 1710 can be further configured to wake up electronic device 1700. For example, if the lens system is illuminated with enough power by an RF source, the output voltage can be used to turn-on a micro-controller (e.g., energy harvesting process 1710) by either generating a signal that triggers the controller or by charging a capacitor that would hold enough energy for the system to operate for one or several cycles. Further, energy harvesting process 1710 can be configured pulse the power source to receive feedback (e.g., power levels, remaining lifetime, etc.). System processor 1715 may be configured to receive a request to connect to an external device (e.g., another electronic device 1700). The request may be received through input device 1740 and/or through automatic routing.

In various implementations, the memory 1705 may be volatile (such as random-access memory (RAM)), non-volatile (such as read-only memory (ROM), flash memory, etc.), or some combination of the two. The memory 1705 may include all, or part, of the functions 1707 and the OS 1706 for the electronic device 1700, among other things. The memory 1705 may also include the OS 1706. Of course, the OS 1706 varies depending on the manufacturer of the electronic device 1700 and currently comprises, for example, iOS 12.1.4 for Apple products and Pie for Android products. The OS 1706 contains the modules and software that supports a computer's basic functions, such as scheduling tasks, executing applications, and controlling peripherals.

The electronic device 1700 may also include additional data storage devices (removable and/or non-removable) such as, for example, magnetic disks, optical disks, or tape. Such additional storage is illustrated in FIG. 17 by removable storage 1720 and non-removable storage 1725. The removable storage 1720 and non-removable storage 1725 can store some, or all, of the instructions for the functionality of the electronic device 1700 and the OS 1706.

Non-transitory computer-readable media may include volatile and nonvolatile, removable and non-removable tangible, physical media implemented in technology for storage of information, such as computer readable instructions, data structures, program modules, or other data. The memory 1705, removable storage 1720, and non-removable storage 1725 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the electronic device 1700. Any such non-transitory computer-readable media may be part of the electronic device 1700 or may be a separate database, databank, remote server, or cloud-based server.

In some implementations, the transceiver(s) 1730 may include any sort of transceivers known in the art. In some examples, the transceiver(s) 1730 can include a wireless modem to facilitate wireless connectivity with the other electronic devices, the Internet, and/or an intranet via a cellular connection. Further, the transceiver(s) 1730 may include a radio transceiver that performs the function of transmitting and receiving radio frequency communications via an antenna (e.g., Wi-Fi or Bluetooth®). In other examples, the transceiver(s) 1730 may include wired communication components, such as a wired modem or Ethernet port, for communicating with the other electronic devices or the provider's Internet-based network.

In some implementations, output device(s) 1735 includes any sort of output devices known in the art, such as a display (e.g., a liquid crystal or thin-film transistor (TFT) display), a touchscreen display, speakers, a vibrating mechanism, or a tactile feedback mechanism. In some examples, output device(s) 1735 can play various sounds based on, for example, whether the electronic device 1700 is connected to a network or other device. Output device(s) 1735 also include ports for one or more peripheral devices, such as headphones, peripheral speakers, or a peripheral display.

In various implementations, input device(s) 1740 includes any sort of input devices known in the art. The input device(s) 1740 may include, for example, a camera, a microphone, a keyboard/keypad, or a touch-sensitive display. A keyboard/keypad may be a standard push-button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Certain embodiments of the disclosed technology are described above with reference to block and flow diagrams of systems and/or methods according to example embodiments of the disclosed technology. Some blocks of the block diagrams and flow diagrams may not necessarily need to be performed in the order presented, or may not necessarily need to be performed at all, according to some embodiments of the disclosed technology.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
an energy harvesting system comprising:
    a Rotman Lens having a beam port side and a transceiver side, the transceiver side configured to be in electrical communication with a transceiver;
    a rectifier network in electrical communication with the beam port side of the Rotman Lens; and
    a power combining network in electrical communication with the rectifier network;
a first power source in electrical communication with the energy harvesting system; and
a second power source in electrical communication with the energy harvesting system;
wherein the first power source and the second power source are connected to the energy harvesting system via a switch.

2. The system of claim 1 further comprising:
a transceiver comprising an antenna.

3. The system of claim 2, wherein the transceiver side of the Rotman Lens is an antenna side in electrical communication with the antenna.

4. The system of claim 1, wherein the system is configured to transition between an initial unpowered state and a powered state, the system having no access to power in the initial unpowered state and the system having access to power via wireless power harvesting in the powered state.

5. The system of claim 3 further comprising one or more additional antennae;

wherein:

the antenna side of the Rotman Lens comprises antenna ports; and each antenna port of the antenna side of the Rotman Lens is in electrical communication with a respective antenna of the antennae.

6. The system of claim 1, wherein the beam port side of the Rotman Lens comprises a plurality of beam ports.

7. The system of claim 2, wherein the antenna is selected from a group consisting of a serially-fed patch antenna and an omni-directional antenna.

8. The system of claim 1, wherein the rectifier network comprises a plurality of DC block capacitors.

9. The system of claim 1, wherein the system is configured provide at least 110° angular coverage at 28 GHz.

10. The system of claim 5 further comprising:

tapers between the antenna side of the Rotman Lens and the antennae; and tapers between the beam port side of the Rotman Lens and the rectifier network.

11. The system of claim 5, wherein the system comprises a total of eight antenna ports and eight antennae.

12. The system of claim 6, wherein the rectifier network comprises a plurality of rectifiers, each rectifier of the plurality of rectifiers connected to a respective beam port of the plurality of beam ports.

13. The system of claim 12, wherein each rectifier of the plurality of rectifiers comprises a rectifying diode.

14. The system of claim 1, wherein the power combining network comprises a plurality of bypass diodes.

15. The system of claim 1, wherein:

the rectifier network comprises rectifiers, each rectifier comprising a rectifying diode, with the rectifier network comprising a total number N rectifying diodes;

the power combining network comprises one or more bypass diodes; and the number of bypass diodes of the power combining network is selected from the group consisting of 2*N and 2*(N−1).

16. An electronic device comprising:

a memory;

a transceiver comprising an antenna array;

a load;

the energy harvesting system of claim 1 further comprising an energy harvesting processor, wherein the transceiver side of the Rotman Lens is in electrical communication with the antenna array of the transceiver;

wherein the energy harvesting system is an energy-autonomous, self-powered harvesting system configured to transition between an initial unpowered state and a powered state, the system having no access to power in the initial unpowered state and the system having access to power via wireless power harvesting in the powered state.

17. The electronic device of claim 16, wherein the memory comprises instructions that, when executed by the energy harvesting processor, are configured to cause the system to:

determine a first power level associated with the first power source;

compare the first power level to a predetermined power threshold; and responsive to determining that the first power level falls below the predetermined power threshold, transmit instructions to cause the output of the power combining network to be in electrical communication with the first power source.

18. A method comprising:

printing, on a first flexible substrate, a Rotman-based rectenna architecture comprising:

a Rotman Lens having a beam port side and a transceiver side, the transceiver side configured to be in electrical communication with a transceiver;

a rectifier network in electrical communication with the beam port side of the Rotman Lens; and one or more antennae;

wherein the transceiver side of the Rotman Lens is an antenna side that is in electrical communication with the one or more antennae;

printing, on a second flexible substrate, a power summation network; and connecting the Rotman-based rectenna architecture of the first flexible substrate to the power summation network of the second flexible substrate through a plurality of individual interconnects.

\* \* \* \* \*